US012271219B2

(12) United States Patent
Hagihara et al.

(10) Patent No.: US 12,271,219 B2
(45) Date of Patent: Apr. 8, 2025

(54) PROTECTIVE BUTTON ASSEMBLY FOR EXTERIOR SURFACES OF VEHICLES

(71) Applicant: Honda Motor Co., Ltd., Tokyo (JP)

(72) Inventors: Tomoya Hagihara, Novi, MI (US); Timothy B. Allen, Dublin, OH (US); Antonio Emilio Sanchez Aguilar, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 17/403,268

(22) Filed: Aug. 16, 2021

(65) Prior Publication Data

US 2023/0052471 A1 Feb. 16, 2023

(51) Int. Cl.

| | |
|---|---|
| ***H01H 13/06*** | (2006.01) |
| ***G05G 1/02*** | (2006.01) |
| ***G05G 25/00*** | (2006.01) |
| ***H01H 9/04*** | (2006.01) |
| *E05F 15/75* | (2015.01) |
| *H01H 3/12* | (2006.01) |
| *H01H 13/14* | (2006.01) |

(52) U.S. Cl.

CPC ............... *G05G 1/02* (2013.01); *G05G 25/00* (2013.01); *H01H 9/04* (2013.01); *H01H 13/06* (2013.01); *E05F 15/75* (2015.01); *E05Y 2400/86* (2013.01); *E05Y 2900/531* (2013.01); *H01H 3/12* (2013.01); *H01H 13/14* (2013.01)

(58) Field of Classification Search

None

See application file for complete search history.

(56) References Cited

U.S. PATENT DOCUMENTS

| | | | | | |
|---|---|---|---|---|---|
| 2,603,963 | A | | 7/1952 | Allen | |
| 3,351,974 | A | * | 11/1967 | Wilhelmi | E05B 85/08 411/72 |
| 3,915,485 | A | * | 10/1975 | Richman | E05B 85/08 70/181 |
| 5,697,493 | A | * | 12/1997 | Sach | H01H 13/702 200/313 |
| 6,242,064 | B1 | * | 6/2001 | Howie, Jr. | A44B 1/06 264/318 |

(Continued)

FOREIGN PATENT DOCUMENTS

| | | |
|---|---|---|
| DE | 4208088 C1 | 4/1993 |
| GB | 2275496 A | 8/1994 |

(Continued)

*Primary Examiner* — Felix O Figueroa

(74) *Attorney, Agent, or Firm* — Plumsea Law Group, LLC

(57) ABSTRACT

A button assembly for an exterior of a vehicle is disclosed. The button assembly is designed with improved water drainage properties. The button assembly includes a button switch and a bezel housing surrounding the button switch that is spaced apart from the button switch. A channel extends between the two components. In one example, the channel has a width of approximately 0.5 mm at one end. In another example, the channel is formed between two surfaces, and the outer surface is sloped relative to the button switch by approximately 15 degrees. Furthermore, in some examples, the channel has a height of approximately 3 mm. Each of these structural characteristics serves to significantly improve the assembly's overall drainage performance, which may be especially essential in colder climates.

20 Claims, 7 Drawing Sheets

(56) References Cited

U.S. PATENT DOCUMENTS

| | | | |
|---|---|---|---|
| 6,810,309 | B2 | 10/2004 | Sadler et al. |
| 7,367,103 | B2 | 5/2008 | Schoemann et al. |
| 7,527,403 | B2 | 5/2009 | Uken |
| 10,073,546 | B2 * | 9/2018 | Miller ................. G06F 3/03547 |
| 10,513,221 | B2 | 12/2019 | Cho et al. |
| 10,549,685 | B2 | 2/2020 | Cho et al. |
| 10,822,848 | B2 | 11/2020 | Worden et al. |
| 10,882,621 | B2 | 1/2021 | Beaudin et al. |
| 11,306,521 | B2 * | 4/2022 | Chavez Romero ..... E05B 85/08 |
| 2019/0345745 | A1 | 11/2019 | Murata et al. |
| 2020/0173206 | A1 | 6/2020 | Chavez Romero et al. |

FOREIGN PATENT DOCUMENTS

| | | | |
|---|---|---|---|
| GB | 2194582 | A | 3/1998 |
| JP | 5315177 | B2 | 10/2013 |
| JP | 6149768 | B2 | 6/2017 |
| JP | 2019175823 | A | 10/2019 |
| JP | 2019175824 | A | 10/2019 |
| JP | 2020061307 | A | 4/2020 |
| KR | 19980026465 | U | 8/1998 |
| KR | 19980029268 | U | 8/1998 |
| KR | 20050087159 | A | 8/2005 |

* cited by examiner

600

| ICE LOCK TEST RESULTS | | |
|---|---|---|
| TRIAL NO. | WITHOUT STRIKING | WITH STRIKING |
| 1 | 32.3 N | 19.6 N |
| 2 | 37.2 N | 14.7 N |
| 3 | 53.9 N | 27.4 N |
| AVERAGE | 41.1 N | 20.6 N |

FIG. 6

PROTECTIVE BUTTON ASSEMBLY FOR EXTERIOR SURFACES OF VEHICLES

BACKGROUND

The present disclosure generally relates to a button assembly for an exterior surface of a vehicle, and more particularly, to a button and bezel arrangement configured to facilitate drainage of water along a vehicle's exterior.

Generally, a vehicle body is provided with various moving parts, for example, a trunk lid and a tailgate, as well as front and rear doors. The moving parts are mounted or otherwise secured within fixed mounting parts of the vehicle body in such a way as to be openable and closeable. At the intersection between the two vehicle parts, gaps are inevitably formed between the moving parts and the fixed parts of the vehicle body. Such gaps are generally referred to as seal gaps. The seal gaps provide the necessary clearance to prevent interference between the moving part and the mounting part. However, while a vehicle is operating, rainwater or other fluids may enter through the seal gaps into the vehicle. Conventionally, in order to reduce the exposure of these areas of the vehicle to undesirable elements, various types of seals or weatherstrips, such as rubber, may be installed in the seal gaps created between the moving parts and corresponding mounting parts of the vehicle body. However, in cases where the moving part is relatively small and must move smoothly in order to provide the required functionality, such seals can be intrusive. In addition, seals can experience wear and tear over time, particularly in cases where the moving part is designed for regular, rugged, daily use by multiple passengers and various degrees of force.

There is a need in the art for a button assembly system that reduces the accumulation of rainwater or other elements while accommodating the installation of the button in vehicles designed for public transport, in particularly with respect to autonomous vehicles.

SUMMARY

The disclosed embodiments provide an exterior button assembly for use in vehicles.

In one aspect, a button assembly for an exterior of a vehicle is disclosed. The assembly includes a button switch with an outermost surface and a bezel housing surrounding the button switch. The bezel housing includes an innermost surface that is spaced apart from and faces toward the outermost surface of the button switch. The assembly further includes a channel extending between the innermost surface and the outermost surface, where the channel has a first width at its proximal end of approximately 0.5 mm.

Another aspect provides a button assembly for an exterior of a vehicle. The assembly includes a button switch with a substantially cylindrical distal portion and a bezel housing surrounding the distal portion. The assembly further includes a channel formed between the distal portion and the bezel housing, the channel having a height of approximately 3 mm.

In yet another aspect, a button assembly for an exterior of a vehicle is disclosed. The assembly includes button switch with an outermost surface and a bezel housing surrounding the button switch. The bezel housing includes an innermost surface that is spaced apart from and faces toward the outermost surface of the button switch. In addition, the assembly includes a channel extending between the innermost surface and the outermost surface, where the innermost surface of the bezel housing extends distally outward at an angle of approximately 15 degrees relative to the outermost surface of the button switch.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 6 is a chart presenting force activation results obtained during trials of the ice-lock test, according to an embodiment.

DETAILED DESCRIPTION

As vehicles become increasingly automated, conventional manually operated components may instead be activated by various control technology, such as push-button mechanisms. As will be described in greater detail below, in different embodiments, components of the proposed button assembly are shaped and dimensioned to provide an effective drainage conduit along the exterior of the vehicle. For example, a button mechanism formed along an exterior of a vehicle that serves as an open or close switch used for vehicle ingress may be disposed on an outer side panel of the vehicle. In order to prevent the accumulation of water in the gap between the movable button and the surrounding bezel, in an exemplary embodiment, the button assembly is arranged such that a minimum gap between the button (e.g., a knob) and outer bezel is 0.5 mm. In addition, the bezel draft angle in the gap is approximately 15 degrees. Furthermore, drainage is significantly improved by providing a relatively low channel height in the gap between the button and the bezel so that water can easily flow out from the gap. It may be appreciated that such features are desirable in preventing the button from sticking or otherwise becoming "ice-locked" due to freezing environmental conditions.

Figure 1:
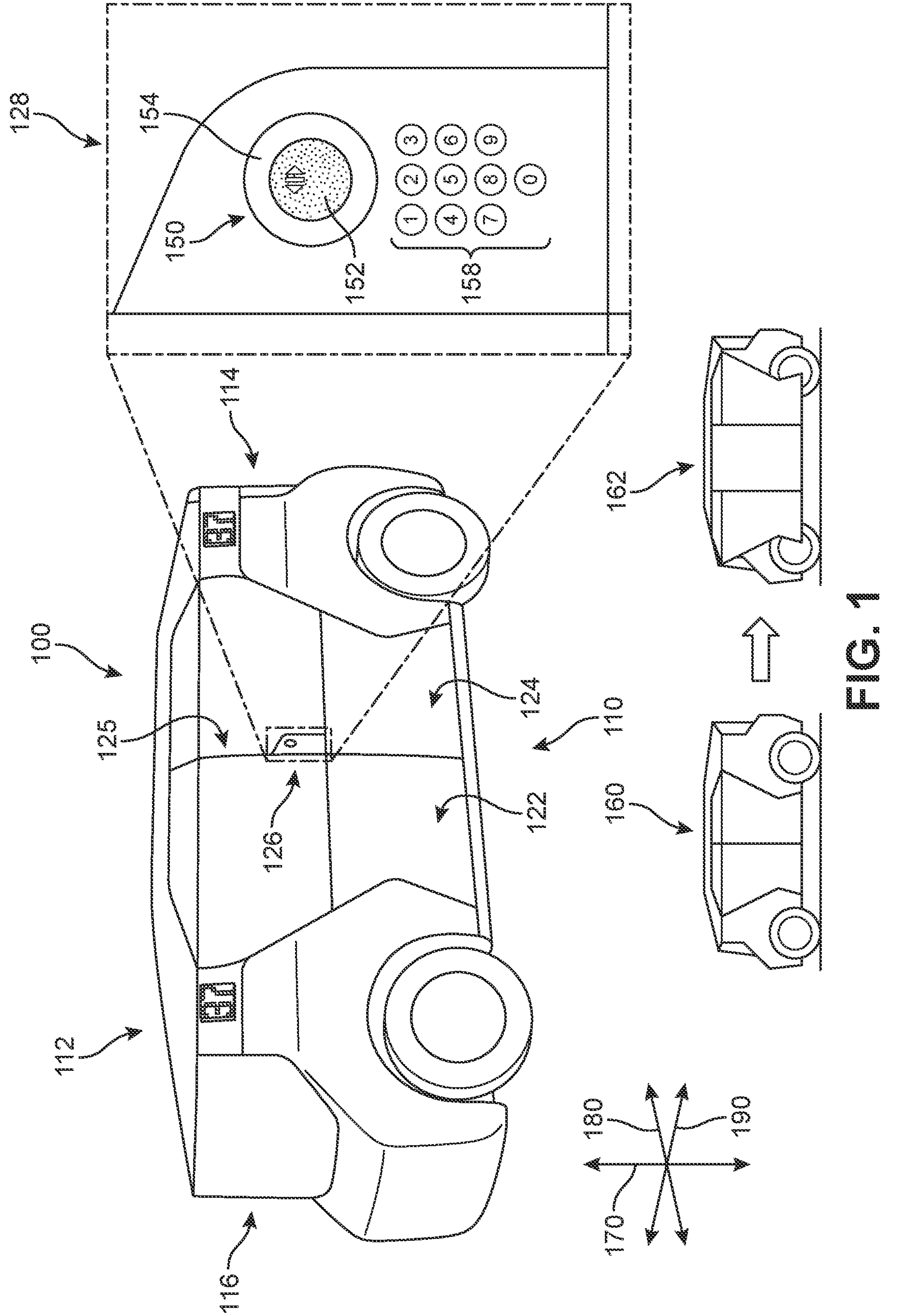
FIG. 1 presents a perspective side view of a vehicle in which a button assembly is installed, according to an embodiment.

For purposes of introduction, an overview of one embodiment of the proposed systems and methods is illustrated with reference to FIGS. 1 and 2A. Referring first to FIG. 1, one example of a vehicle 100 in which an embodiment of a proposed button assembly 150 is installed is depicted. Simply for purposes of reference, vehicle 100 may be understood to generally comprise a forward end portion ("forward end") 116, a rearward end portion ("rearward end") 114, a first side portion ("first side") 110 and a second side portion ("second side") 112. In this case, the button assembly 150 is shown installed in a panel portion 126 formed along the first side 114. It can be appreciated that in other embodiments the button assembly 150 may alternatively or additionally be used along the second side 112, forward end 116, and/or rearward end 114.

For purposes of convenience, the description makes reference to a set of axes. As a general matter, the term "longitudinal axis" as used throughout this detailed description and in the claims refers to an axis that extends in a longitudinal direction, which is a direction extending the length of a component, such as the length of the vehicle 100 between the forward end 116 and rearward end 114. Similarly, the term "lateral axis" as used throughout this detailed description and in the claims refers to an axis that extends in a lateral direction, which is a direction running a width of each component, such as between the first end 110 and second end 112 of vehicle 100. In addition, the term "vertical axis" as used throughout this detailed description and in the claims refers to an axis that extends in a vertical direction, for example in FIG. 1 is a direction running from the roof structure to the floor of a vehicle. Each axis of the three axes may be understood to be orthogonal relative to the other two axes. For clarity, a set of axes depicting a vertical axis 170, a longitudinal axis 180, and a lateral axis 190 are shown in FIG. 1.

Furthermore, the description makes reference to distal and proximal directions (or portions). As used herein, the distal direction is a direction outward or oriented away from a center of the vehicle 100. Also, the proximal direction is a direction oriented toward a center of the vehicle 100. Thus, a distal side or region refers to a portion of a component that is disposed further from the center and a proximal side or region refers to a portion of a component that is disposed nearer to the center. In this case, the button assembly 150 may be understood to have an exterior-facing side configured for contact by users that is distal relative to an interior facing side (not shown in FIG. 1) that is integrated within the door.

In the example of FIG. 1, the vehicle 100 shown is an autonomous vehicle. As a general matter, autonomous vehicles herein refer to unmanned devices which have a drive means or propulsion means in order to move the autonomous device ("self-propelled") and an onboard energy reservoir to power the propulsion mean. In some embodiments, the AV also includes one or more sensors and a control means functionally connected to the sensor(s) and the drive means. The AV navigates in a free manner that can occur without human support based on sensor data acquired by one or more sensor(s) and processed in the control means in order to generate control signals for the propulsion means. In other embodiments, the AV can receive remote command signals from a human operator or other centralized coordinator control module.

However, in other embodiments, the proposed button assembly may be utilized by any other type of vehicle or component surface that may be exposed to fluids or other undesirable elements. For example, the control system is similarly amenable for use with other types of vehicles, such as sedans, coupes, hatchbacks, station wagons, buses, trucks, etc. The illustrated shared autonomous vehicle 100 is used as the exemplary vehicle due to the use of double sliding doors, which offer expanded and easier access to the shared passenger compartment. Thus, particularly in the case of some shared vehicles that may be driverless and used for ride-sharing, being outfitted a button assembly with a specialized drainage structure can significantly reduce the cost for both the manufacturer and, down the road, the passengers, as the life of the button is extended and/or the number of parts comprising the assembly is reduced as the need for a sealing material is removed. The assembly allows for lower costs in production, maintenance, repair, and replacement. In addition, repetitive and potentially rugged use by a wide range of passengers who may not be invested in maintaining the overall condition of components of the vehicle are more readily accommodate by the proposed design. As will be discussed in detail below, this arrangement is possible in part because of the structural features of a button component ("button") 152 relative to an outer bezel housing ("bezel") 154 that surrounds the button 152, shown more clearly in an enlarged view 128 of panel 126.

For purposes of context, it can be seen in FIG. 1, the button assembly 150 may be disposed adjacent to or otherwise near a keypad 158 or other lock/unlock mechanism. In other embodiments, the keypad 158 may be absent. As shown in FIG. 1, in some embodiments, activation of the button assembly 150 can cause a change in the vehicle's access mode from a closed mode 160 to an open mode 162. Thus, in different embodiments, the button mechanism of button assembly 150 can be configured to trigger or activate various features of vehicle 100. In this specific example, the button assembly 150, comprising the bezel 154 for protecting components of control technology for an automatic sliding door mechanism 120 including a first door 122 and a second door 124. In one embodiment, the bezel 154 prevents dust, dirt, or fluid from entering the space surrounding the button 152. In other embodiments, sliding door mechanism 120 may include only one door. In different embodiments, each sliding door is a "power" sliding door that, on a condition that the sliding door is in a closed state and unlocked state, automatically opens in a motorized manner when the user pushes the button 152.

Figure 2A:
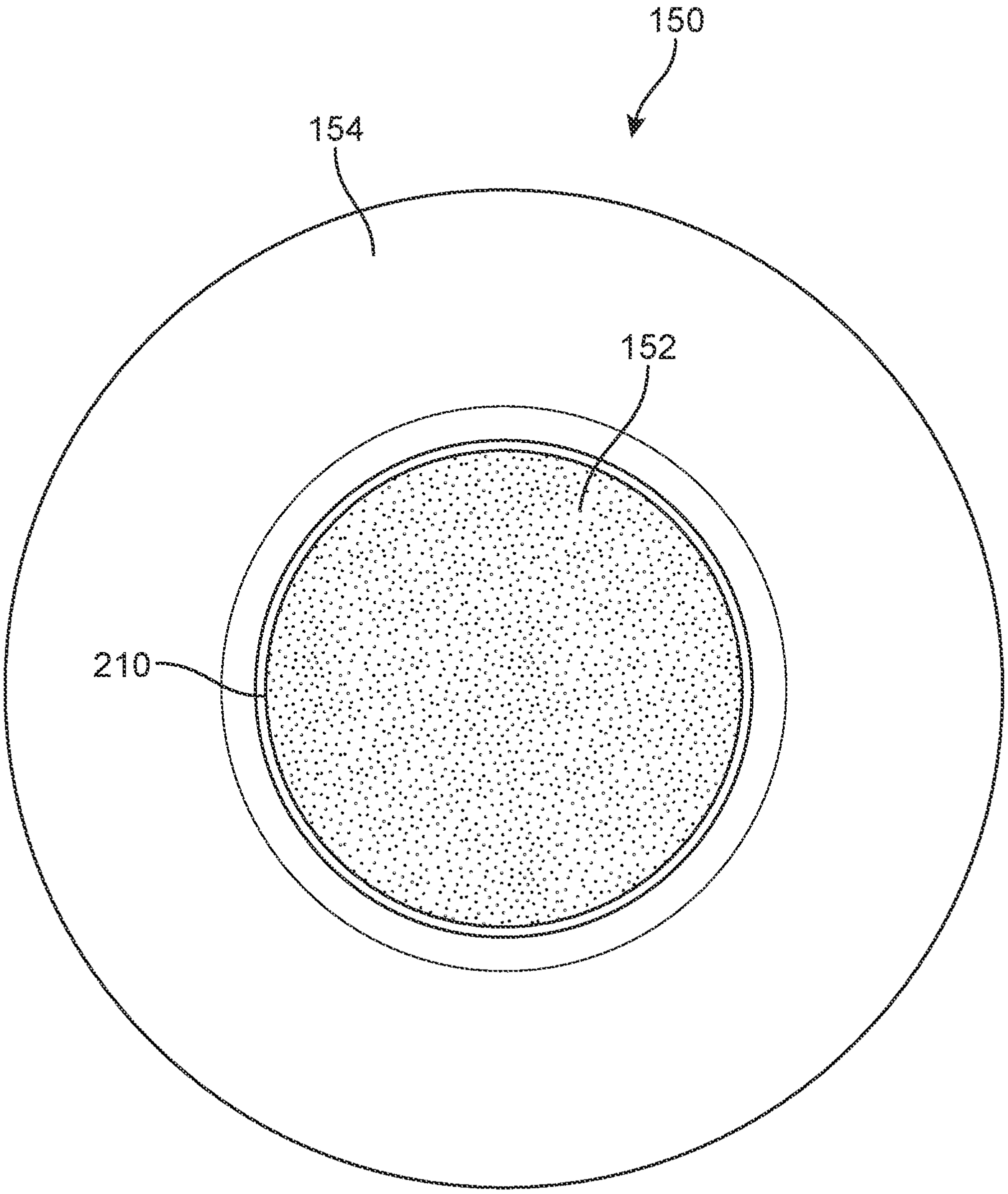
FIG. 2A is a front view of the button assembly, according to an embodiment.

FIG. 2A presents an isolated front view of an embodiment of button assembly 150 comprising button 152 and bezel 154. In this view, the button 152 can be seen to have a substantially round cross-sectional shape, while the bezel 154 forms a ring around the button 152. For example, the bezel 154 may be round or partially torus in shape and include a central hollow interior region that is sized to receive the button switch and provide a channel between the two components as described herein. In other embodiments, the button 152 may include other shapes including an oval, ellipse, or other regular or irregular shapes, while the bezel 154 is shaped to surround the selected shape. A gap 210 between an innermost perimeter of the bezel 154 and an outermost perimeter of the button 152 can also be observed in FIG. 2A. The gap 210 is configured to permit the button 152 to freely move (e.g., become depressed) and return to the initial position, while the bezel 154 remains fixed in place. In one example, the gap 210 runs around the entire button 152, and its distal opening (nearest to the exterior surface of the vehicle) is substantially constant in width between the two components.

Figure 2B:
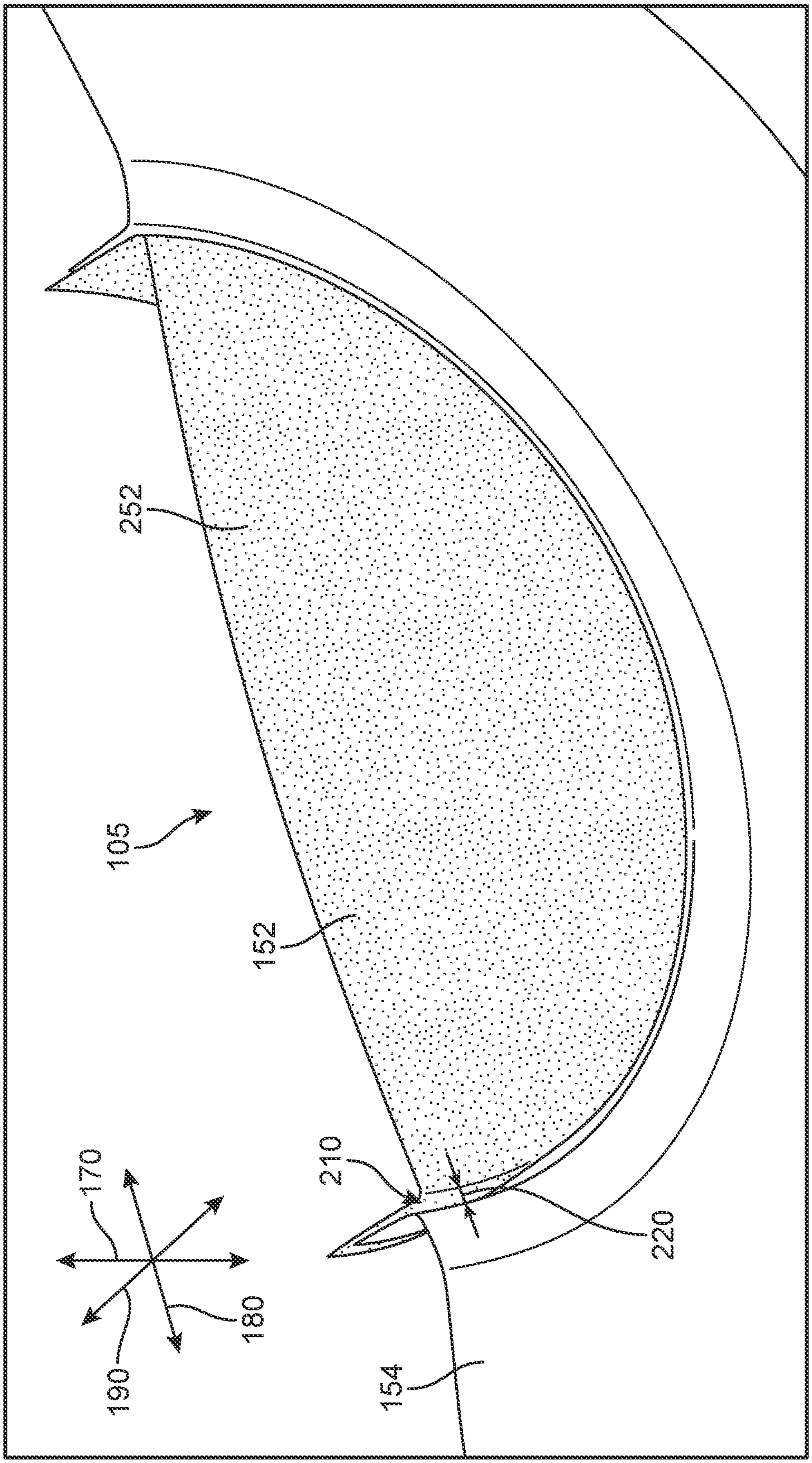
FIG. 2B is a cutaway perspective view of a portion of the button assembly, according to an embodiment.

In FIG. 2B, a simplified perspective cutaway view of button assembly 150 is shown in order to better illustrate the relative arrangement of the button 152 and bezel 154. The cutaway can be understood to have been taken near or along an approximate midline of the button assembly 150. For purposes of simplicity, the components are presented as hollow. In this example, the gap 210 can be seen more clearly as having a first width 220 around the distal opening. A forward surface 252 of the button faces distally outward and is configured for contact with human fingers.

Figure 3:
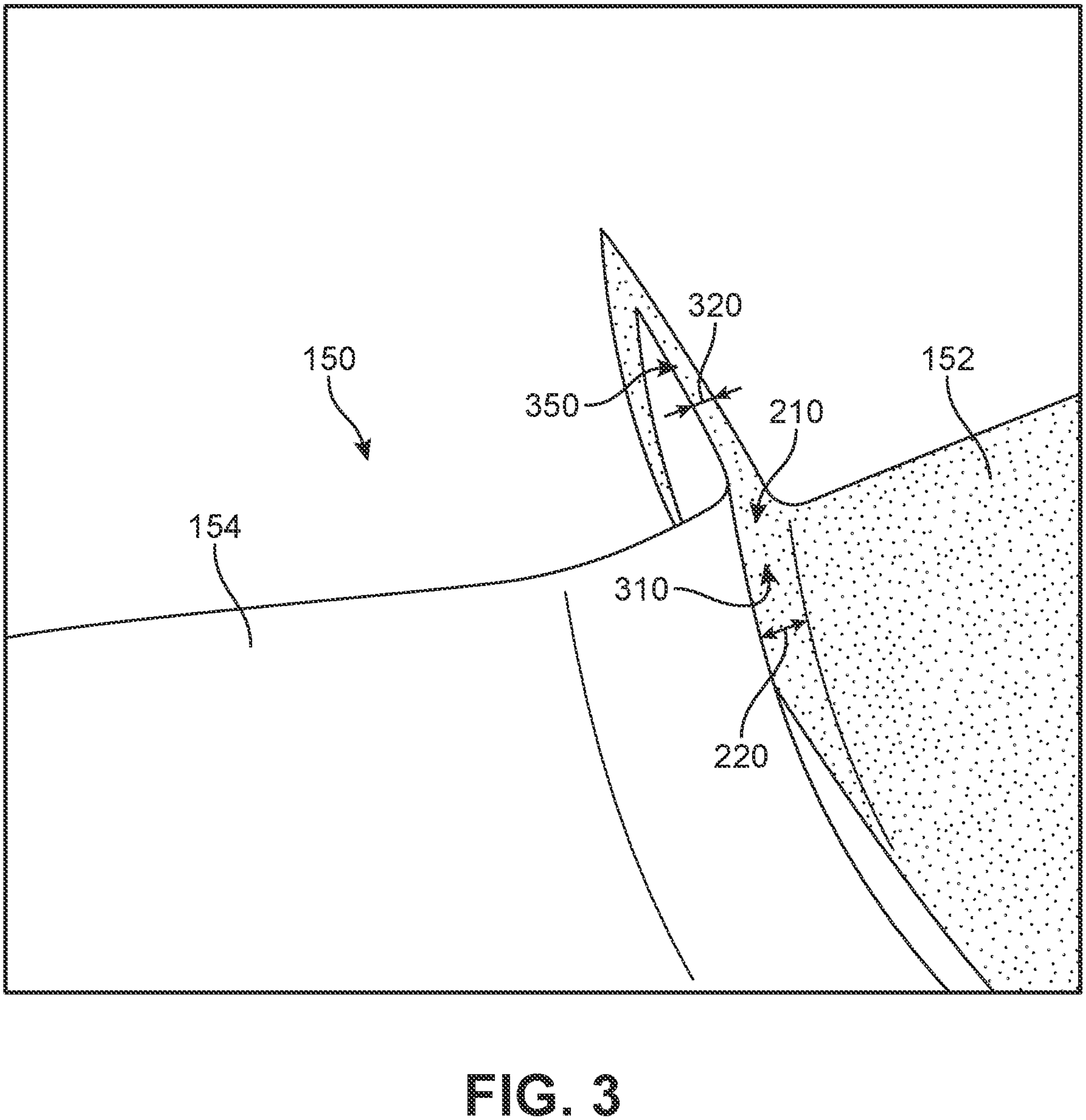
FIG. 3 is a magnified view of a portion of the cutaway perspective view of FIG. 2B, according to an embodiment.

A magnified view of a portion of the cutaway view is shown in FIG. 3 that introduces the relative change in width as the gap 210 extends proximally inward. In other words, in some embodiments, moving through a channel 350 associated with the gap 210, the width can change. For example, while a distal opening 310 of a channel 350 has a first width 220, moving deeper or proximally inward, the channel 350 has a smaller or narrower second width 320.

Figure 4:
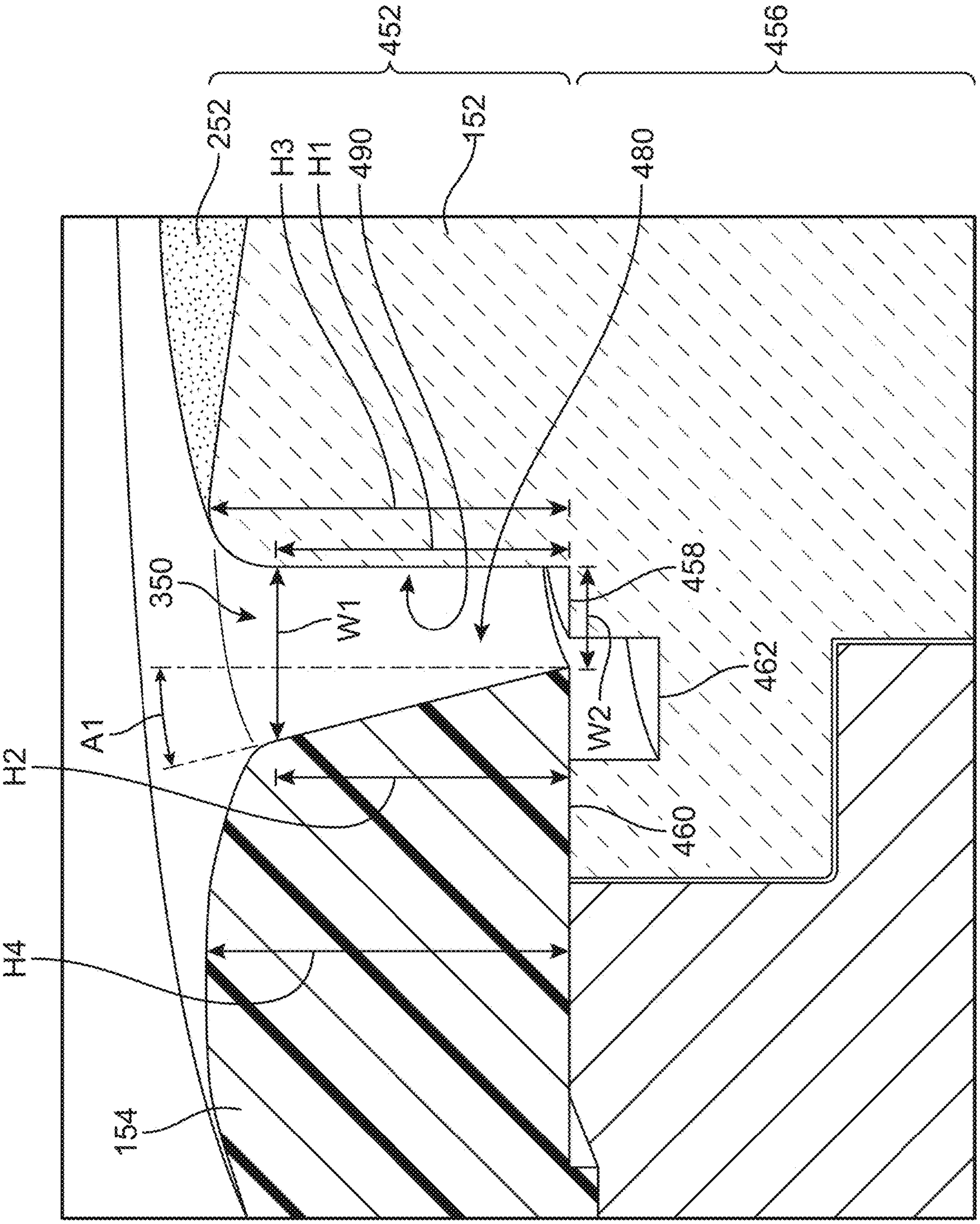
FIG. 4 is a schematic cutaway view of the button assembly showing the structural characteristics of the channel formed between the bezel and button, according to an embodiment.

Additional details regarding the relative spacing and surface orientation of the two components are presented with reference to a cutaway view in FIG. 4. As shown in FIG. 4, the bezel 154 is spaced apart in a radial direction from an upper or distal portion 452 of the button 152, forming channel 350 that extends around the distal portion 452 of button 152. Button 152 has a base or proximal portion 456 including a first radially extending surface 458, a second radially extending surface 460, and a circumferential groove 462 disposed between the first radially extending surface 458 and the second radially extending surface 460. In some embodiments, the distal portion 452 can refer to the knob portion for button 152 that is disposed distally outward relative to the a base or proximal portion 456. In one example, the distal portion 452 is substantially cylindrical in shape. In some embodiments, a radially outermost surface 490 of the distal portion 452 of button 152 is substantially planar and has a height H1. In one example, the outermost surface 490 is substantially parallel to/aligned with the lateral axis of the vehicle, or perpendicular relative to the longitudinal axis. In some embodiments, at the distal end of the channel 350 the outermost surface 490 can merge with a curved surface (toward center of the circular button) to provide a slightly larger height H3 that ends at the forward surface 252. In addition, in the embodiment of FIG. 4, the bezel 154 has a maximum height H4 that is substantially similar to height H3. It can further be observed that a radially innermost surface 480 of the bezel 154 has a height H2 that is substantially similar to height H1. Thus, the channel 350 can be understood to be formed and/or extend between boundaries provided by the innermost and outermost surfaces. In different embodiments, the channel 350 depth (or height as identified in the drawing) is relatively low, and may be approximately 3 mm, allowing water to easily drain from the gap. In an exemplary embodiment, the channel height is approximately 3 mm. The height of approximately 3 mm was tested and shown to provide better water drainage than larger channel heights. In other embodiments, the relative heights of each surface may vary while the minimum gap distance and draft angle are maintained.

Furthermore, it can be seen that innermost surface 480 of the bezel is sloped or inclined relative to the outermost surface 490 of the distal portion 452 of button 152. In other words, the innermost surface 480 has a slope that is associated with an increase in distance between the two components from an interior of the channel 350 to an exterior of the channel 350. In this exemplary example, the innermost surface 480 is associated with an angle A1 of approximately 15 degrees relative to the outermost surface 490 of the button. This relatively large draft angle has been shown to allow water to drain easily from the gap while retaining the protective features of the bezel housing around the button. Together with the relatively low channel depth, water drainage is significantly improved. In other embodiments, the draft angle A1 can be greater or less than 15 degrees (+/−5 degrees). In addition, once the innermost surface 380 reaches the channel exit, the bezel can slope further upward and radially outward.

It may be appreciated that the inclination of the innermost surface 480 ensures that a width W2 between the bezel 154 and button 152 is smallest at the bottom of the channel 350, and largest at the top of the channel 350. In an exemplary embodiment, the gap or distance W2 (the smallest distance between the components) is approximately 0.5 mm at a base of the channel associated with its proximal end, and gradually and steadily increases as it approaches the exterior of the button assembly at its distal end to a maximum width W1. The minimum distance W2 of approximately 0.5 mm was tested and shown to provide better water drainage than smaller base widths. In other embodiments, the distance W2 can be slightly greater or less than 0.5 mm (+/−0.7 mm), for example to accommodate a thickness of paint that may be applied to the surfaces of the components.

Figure 5A:
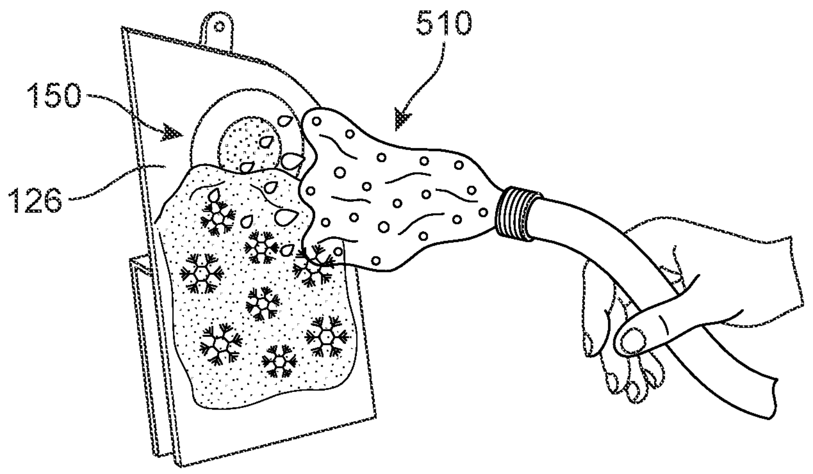
FIGS. 5A-5C are a sequence depicting an example ice-lock test performed on the button assembly, according to an embodiment.
Figure 5B:
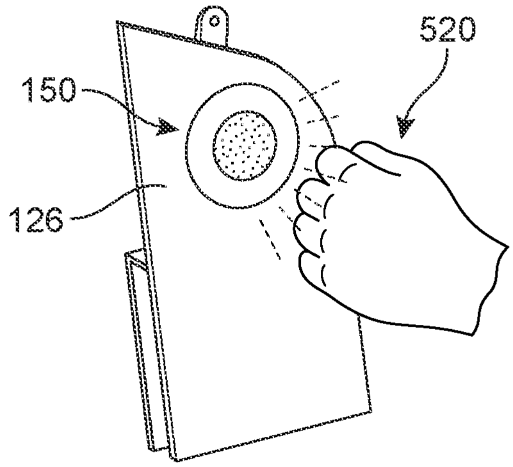
Figure 5C:
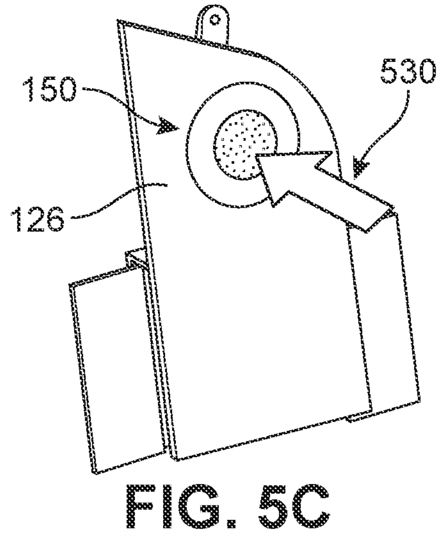

As noted above, the proposed structural characteristics can offer significantly improved drainage properties for the button assembly. An example of some of these improvements is presented in FIGS. 5A-5C, where a depiction of an ice-lock test that was performed on an embodiment of the button assembly 150 is shown. In FIG. 5A, water 510 is splashed, poured, or otherwise caused to enter the gap formed in the button assembly 150, here installed on panel 126. The panel 126 with button assembly 150 is then immediately placed in a cold chamber (i.e., a space at −40 degrees+/−5 degrees) for a period of time (e.g., two hours). In FIG. 5B, the panel 126 is removed from the cold chamber, and is exposed to various levels of force, such as punches, slaps, or other pressures that could be applied by a human hand or arm 520. In FIG. 5C, the panel 126 is attached to a wall or other flat surface in a manner similar to its installation on a side door of a vehicle and the activation force values 530 are obtained by a push-pull gauge.

FIG. 6 presents a chart 600 with results of the ice-lock test performed over three trials. For each of the three trials, activation force values before hitting or striking the button assembly are less than 60 N (with an average value of 41.1 N). Activation force values after striking the button assembly are less than 35 N (with an average value of 20.6 N). In contrast to other designs in which the button mechanism became stuck and/or required an inordinate amount of force to activate, the proposed button assembly is configured to accumulate significantly less water, and thus be easier to press or push-activate following a freeze. In other words, the drainage of water using the proposed assembly is highly effective in reducing or preventing the need for excessive force in releasing the button during cold weather.

In different embodiments, the button assemblies described herein can offer significant advantages, particularly with respect to drainage flow. As discussed above, the button and bezel include specific structural characteristics that improve drainage for the button assembly. In one example, the button assembly includes a button switch with an outermost surface and a bezel housing surrounding the button switch. The bezel housing includes an innermost surface that is spaced apart from and faces toward the outermost surface of the button switch. The assembly further includes a channel extending between the innermost surface and the outermost surface, where the channel has a first width at its proximal end of approximately 0.5 mm.

In another example, a button assembly includes a button switch with a substantially cylindrical distal portion and a bezel housing surrounding the distal portion. The assembly further includes a channel formed between the distal portion and the bezel housing, the channel having a height of approximately 3 mm. In yet another example, the button assembly includes button switch with an outermost surface and a bezel housing surrounding the button switch. The bezel housing includes an innermost surface that is spaced apart from and faces toward the outermost surface of the button switch. In addition, the assembly includes a channel extending between the innermost surface and the outermost surface, where the innermost surface of the bezel housing extends distally outward at an angle of approximately 15 degrees relative to the outermost surface of the button switch.

In some embodiments, the assembly also includes additional features. In one example, the channel has a second width at its distal end that is greater than the first width. In such cases, the width of the channel can increase at a substantially steady rate from the proximal end to the distal end. In another example, the button switch has a substantially round cross-sectional shape and the bezel housing has a substantially ringed cross-sectional shape. In some embodiments, the innermost surface extends distally outward at an angle of approximately 15 degrees relative to the outermost surface. In another example, the channel has a height of approximately 3 mm. In some cases, the channel has a substantially trapezoidal cross-sectional shape (e.g., a right trapezoid). In some embodiments, the channel has a first width at its proximal end that is approximately 0.5 mm. In another example, an innermost surface of the bezel housing provides an outer boundary of the channel, and the innermost surface extends distally outward at an angle of approximately 15 degrees relative to an outermost surface of the button switch.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In different embodiments, vehicles described herein can be understood to include a vehicle control system. The vehicle control system is realized by, for example, one or more processors or hardware having equivalent functions. The vehicle control system may have a configuration in which a processor such as a central processing unit (CPU), a data storage device, an electronic control unit (ECU) in which a communication interface is connected by an internal bus, a micro-processing unit (MPU), and the like are combined. In some embodiments, the vehicle control system can include components and modules configured to enable an AV to operate autonomously. As some non-limiting examples, the vehicle control system might include a target lane determination module, an automated driving control module, a travel control module, a human-machine interface (HMI) control module, a door control module, and/or a storage module. The automated driving control module could include, for example, an automated driving mode control module, a vehicle position recognition module, an external environment recognition module, an action plan generation module, a trajectory generation module, and/or a switching control module. Each module can be realized or implemented by the processor executing a program (software). Further, some or all of these may be realized by hardware such as a large-scale integration (LSI) or an application specific integrated circuit (ASIC) or may be realized by a combination of software and hardware. In some embodiments, information such as map information, target lane information, action planning information, and HMI control can be stored in the storage module. The program executed by the processor may be stored in the storage module in advance, or may be downloaded from an external device via a communications module.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A button assembly for an exterior of a vehicle, where a lateral axis runs along a width of the vehicle from a first side portion of the vehicle to a second side portion of the vehicle, the assembly comprising:
- a button switch having:
  - a button switch base having a first radially extending surface and a second radially extending surface both extending in a direction perpendicular to the lateral axis and both flat along their entirety, the first radially extending surface and the second radially extending surface facing distally outward, the first radially extending surface coplanar with the second radially extending surface;
  - a circumferential groove disposed between the first radially extending surface and the second radially extending surface;
  - a distal portion that is disposed distally outward relative to the button switch base and having:
    - a button switch forward surface facing distally outward, the button switch forward surface configured for contact with human fingers and having a curved shape;
    - a radially outermost side surface that is planar and extends in a direction aligned with the lateral axis, the radially outermost side surface merging with the curved shape of the button switch forward surface at a point opposite the button switch base, the radially outermost side surface having a height of approximately 3 mm extending between the first radially extending surface and a first region where the radially outermost side surface merges with the curved shape of the button switch forward surface; and
- a bezel housing forming a ring surrounding the distal portion of the button switch and overlying the second radially extending surface, the bezel housing including:

a bezel housing forward surface facing distally outward and having a curved shape;

a bezel housing rearward surface opposite the bezel housing forward surface, the bezel housing rearward surface having a flat portion overlying and abutting the second radially extending surface; and a radially innermost side surface that is spaced apart from and faces toward the radially outermost side surface of the button switch, the radially innermost side surface being sloped at an angle relative to the lateral axis and merging with the curved shape of the bezel housing forward surface and having a height of approximately 3 mm extending between the second radially extending surface and a second region where the radially innermost side surface merges with the curved shape of the bezel housing forward surface; and a channel formed between the radially innermost side surface and the radially outermost side surface, wherein the channel extends around the distal portion of the button switch and the channel is defined between the radially innermost side surface, the radially outermost side surface, and the first radially extending surface of the button switch base, such that the first radially extending surface forms a channel base and the height of the channel is defined by the height of the radially innermost side surface and the height of the radially outermost side surface.

2. The button assembly of claim 1, wherein the first radially extending surface forms the channel base defined between radially outermost side surface and the radially innermost side surface and having a first width of at least approximately 0.5 mm.

3. The button assembly of claim 2, wherein the channel has a second width extending between the radially innermost side surface and the radially outermost side surface at a position distal with respect to the channel base, the second width being greater than the first width.

4. The button assembly of claim 1, wherein the bezel housing has a bezel housing proximal surface that is opposite the bezel housing forward surface, the bezel housing proximal surface being planar.

5. The button assembly of claim 1, wherein the innermost side surface extends outward at an angle of approximately 15 degrees relative to the outermost side surface, providing a large enough draft angle to permit water to drain while retaining protective features of the bezel housing.

6. The button assembly of claim 1, wherein the button switch base, including the first radially extending surface, the second radially extending surface, and the distal portion of the button switch are monolithic.

7. The button assembly of claim 1, wherein the channel has a substantially trapezoidal cross-sectional shape.

8. A button assembly for an exterior of a vehicle, where a lateral axis runs along a width of the vehicle from a first side portion of the vehicle to a second side portion of the vehicle, the assembly comprising:

a button switch having:

a substantially cylindrical knob portion having:

a button switch forward surface facing distally outward and configured for contact with human fingers; and a radially outermost side surface extending proximally from the button switch forward surface;

a button switch base forming a flange radially extending from the substantially cylindrical knob portion and disposed proximally inward relative to the substantially cylindrical knob portion, the button switch base having a first radially extending surface that is flat and extends in a direction perpendicular to the lateral axis and a second radially extending surface that is coplanar with the first radially extending surface; and a circumferential groove disposed between the first radially extending surface and the second radially extending surface;

a bezel housing forming a ring surrounding the knob portion and overlying the second radially extending surface, the bezel housing including:

a bezel housing forward surface facing distally outward and having a curved shape;

a bezel housing rearward surface opposite the bezel housing forward surface, the bezel housing rearward surface having a flat portion overlying and abutting the second radially extending surface; and a radially innermost side surface that is spaced apart from and faces toward the radially outermost side surface of the knob portion, the radially innermost side surface being sloped at an angle relative to the lateral axis and merging with the curved surface of the bezel housing forward surface; and a channel formed between the radially innermost side surface and the radially outermost side surface, wherein the channel extends around the knob portion and the channel is defined between the radially innermost side surface, the radially outermost side surface, and the first radially extending surface of the button switch base, such that the first radially extending surface forms a channel base defined between radially outermost side surface and the radially innermost side surface, the channel base having a first width of at least approximately 0.5 mm.

9. The button assembly of claim 8, wherein the bezel housing has a bezel housing proximal surface that is opposite the bezel housing forward surface, the bezel housing proximal surface being planar.

10. The button assembly of claim 8, wherein the channel has a second width extending between the radially innermost side surface and the radially outermost side surface at a position distal with respect to the channel base, the second width being greater than the first width.

11. The button assembly of claim 10, wherein the channel increases in width between the radially innermost side surface and the radially outermost side surface at a substantially steady rate from the channel base to the second width.

12. The button assembly of claim 8, wherein the button switch base and the knob portion of the button switch are monolithic.

13. The button assembly of claim 8, wherein an innermost side surface of the bezel housing providing an outer boundary of the channel extends distally outward at an angle of approximately 15 degrees relative to an outermost side surface of the button switch.

14. The button assembly of claim 8, wherein the channel has a substantially trapezoidal cross-sectional shape.

15. A button assembly for an exterior of a vehicle, where a lateral axis runs along a width of the vehicle from a first side portion of the vehicle to a second side portion of the vehicle, the assembly comprising:

a button switch having:

a button switch base having a first radially extending surface and a second radially extending surface both extending in a direction perpendicular to the lateral axis and both flat along their entirety, the first radially extending surface and the second radially extending surface facing distally outward, the first radially extending surface coplanar with the second radially extending surface;

a circumferential groove disposed between the first radially extending surface and the second radially extending surface;

a substantially cylindrical knob portion that is disposed distally outward relative to the button switch base and having:

a button switch forward surface facing distally outward and configured for contact with human fingers and having a curved shape; and a radially outermost side surface that is planar and extends in a direction aligned with the lateral axis, the radially outermost side surface merging with the curved shape of the button switch forward surface at a point opposite the button switch base, the radially outermost side surface having a radially outermost side surface height of approximately 3 mm extending between the first radially extending surface and a first region where the radially outermost side surface merges with the curved shape of the button switch forward surface;

a first maximum height extending between the first radially extending surface and the button switch forward surface;

a bezel housing forming a ring surrounding the knob portion and overlying the second radially extending surface, the bezel housing including:

a bezel housing forward surface facing distally outward and having a curved shape;

a bezel housing rearward surface opposite the bezel housing forward surface, the bezel housing rearward surface having a flat portion overlying and abutting the second radially extending surface;

a radially innermost side surface that is spaced apart from and faces toward the radially outermost surface of the knob portion, the radially innermost side surface extending away from the knob portion at an angle of approximately 15 degrees relative to the lateral axis and merging with the curved surface of the bezel housing forward surface having a radially innermost side surface height of approximately 3 mm extending between the first radially extending surface and a second region where the radially innermost side surface merges with the curved shape of the bezel housing forward surface;

a second maximum height extending between the second radially extending surface and a bezel housing forward surface, the second maximum height being; and a channel extending between the radially innermost side surface and the radially outermost side surface, wherein the channel extends around the distal portion of the knob portion and the channel is defined between the radially innermost side surface, the radially outermost side surface, and the first radially extending surface of the button switch base, such that the first radially extending surface forms a channel base having a first width of at least approximately 0.5 mm and the height of the channel is defined by the height of the radially innermost side surface and the height of the radially outermost side surface.

16. The button assembly of claim 15, wherein the channel has a second width extending between the radially innermost side surface and the radially outermost side surface at a position distal with respect to the channel base, the second width being greater than the first width.

17. The button assembly of claim 15, wherein the button switch base, including the first radially extending surface and the second radially extending surface, and the substantially cylindrical knob portion are monolithic.

18. The button assembly of claim 15, wherein the bezel housing has a bezel housing proximal surface that is opposite the bezel housing forward surface, the bezel housing proximal surface being planar.

19. The button assembly of claim 15, wherein the first radially extending surface and the second radially extending surface are monolithic.

20. The button assembly of claim 15, wherein the channel has a substantially trapezoidal cross-sectional shape.

* * * * *